(12) United States Patent
Berstis et al.

(10) Patent No.: US 6,243,647 B1
(45) Date of Patent: Jun. 5, 2001

(54) THREE DIMENSIONAL DISPLAY FOR TIME MULTIPLEXED GLOBAL POSITIONING SYSTEM CELL LOCATION BEACON SYSTEM

(75) Inventors: Viktors Berstis, Austin; Joel Leslie Smith, Round Rock, both of TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/239,334

(22) Filed: Jan. 28, 1999

(51) Int. Cl.[7] .................................................. G06F 7/00
(52) U.S. Cl. .................. 701/213; 340/903; 340/988; 340/825.49; 342/357.01; 342/357.08; 342/357.13; 701/300
(58) Field of Search ................................. 701/207, 208, 701/213, 300, 301, 116–120; 340/903, 961, 988–992, 995, 825.36, 825.49; 342/29–31, 36, 357.01, 357.06–357.09, 357.12, 357.13, 454–458; 348/113, 116–118; 375/130, 347

(56) References Cited

U.S. PATENT DOCUMENTS

| | | | |
|---|---|---|---|
| 5,381,338 | * | 1/1995 | Wysocki et al. ................... 701/207 |
| 5,450,329 | * | 9/1995 | Tanner ................................. 701/213 |
| 5,907,293 | * | 5/1999 | Tognazzini .......................... 340/903 |

* cited by examiner

Primary Examiner—William A. Cuchlinski, Jr.
Assistant Examiner—Edward Pipala
(74) Attorney, Agent, or Firm—Jeffrey S. LaBaw

(57) ABSTRACT

The location of machines in space is displayed in a three dimensional user interface. At each machine of a plurality of machines, the location of the machine is determined via a global positioning system calculation. Each machine, determining a cell corresponding to the GPS determined location. The machines broadcasting a message at a time slice allocated for the cell, wherein the message is indicative of the type of machine broadcasting. The machine which presents the interface receives broadcasted messages from the plurality of machines. Using the received broadcasted messages, it determines the locations of the plurality of machines. Next, the presentation machine chooses a representation of each machine according to a machine type. Finally, the user interface is constructed by orienting and presenting the representations within a user interface showing a volume of space according to the determined locations.

26 Claims, 12 Drawing Sheets

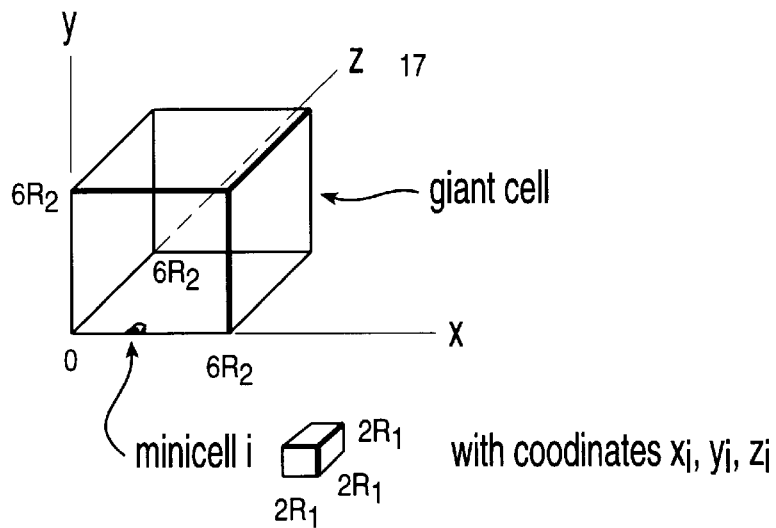

$n = 6R_2 \div 2R_1$ = number of mini cells along each axis
$n^3$ = number of minicells in a giant cell
let m be number of frequency channels
$K = n^3 \div n$ = number of time slots $$j = f\left(\frac{X_i}{6R_2}\right).n + f\left(\frac{Y_i}{6R_2}\right).n^2 + f\left(\frac{Z_i}{6R_2}\right).n^3 = \text{cell number for minicell i within giant cell}$$

where $f\left(\frac{a}{b}\right)$ is remainder of $a \div b$
$j \div k$ discarding remainder is the frequency channel number
remainder of $j \div k$ is time slot number m.

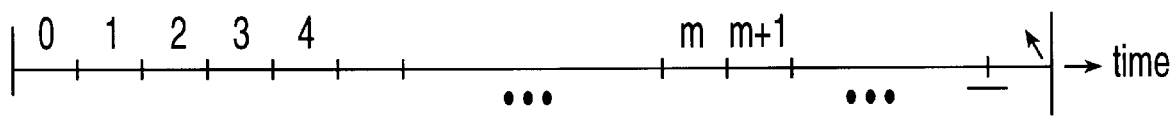

FIG. 4B

| | | | | |
|---|---|---|---|---|
| Vehicle Type #1 | Icon Left | Icon Right | Icon Up | Icon Down |
| Vehicle Type #2 | — — | — — | — — | — — |
| Vehicle Type #3 | — — | — — | — — | — — |
| Default Aircraft | — — | — — | — — | — — |
| Default Commercial Jet | — — | — — | — — | — — |
| Truck | — — | — — | — — | — — |
| Tower | — — | — — | — — | — — |
| Mountain | — — | — — | — — | — — |
| TV Antenna | — — | — — | — — | — — |
| T-Storms | — — | — — | — — | — — |

FIG. 10

THREE DIMENSIONAL DISPLAY FOR TIME MULTIPLEXED GLOBAL POSITIONING SYSTEM CELL LOCATION BEACON SYSTEM

BACKGROUND OF THE INVENTION

This invention relates generally to determining position by electromagnetic radiation. More particularly, the invention relates to an improved system for displaying transmitted position data between vehicles.

As the world becomes a more crowded and busy place, vehicular traffic, on land, on sea and in the air has correspondingly become more crowded. This has resulted in the increased likelihood of collisions with other vehicles as well as with stationary objects. In addition, a need has been recognized to manage the increased traffic levels in a more efficient manner to allow the greatest use of the highways and airways. Anticollision devices have been developed which alert the operators of the vehicles in the event of an imminent collision so that evasive actions may be undertaken. So called smart roads have been proposed to allow properly configured land based vehicles such as automobiles and trucks to be controlled by a central agency.

The problem of collisions is particularly acute with aircraft as the potential for a catastrophic loss of life is great. The Federal Aircraft Administration (FAA) has mandated that all aircraft having more than 30 seats be equipped with collision avoidance equipment generally known as Traffic Alert and Collision Avoidance Systems (TCAS). The commercial TCAS system relies on the continuous operation of Air Traffic Control Radar Beacon System (ATCRBS) transponders in all private, commercial and military aircraft. There are a variety of types of ATCRBS transponders in use which have a number of deficiencies. For instance, not all of the transponders transmit altitude information making collision avoidance somewhat problematic. Another problem is that the TCAS are limited in areas of high traffic volume where system saturation causes transponder signals from different aircraft to overlap. For example, if two aircraft are equidistant from the radar transmitter, they will respond at the same time and overlay each other's signal. Furthermore, the timing of the return signal must be accurately measured to help determine the location of the aircraft. A greater problem, however, is the high cost of the TCAS which has inhibited its widespread use in noncommercial aircraft.

A number of references have suggested that the Global Positioning System (GPS) made be used as part of a collision avoidance system. GPS is currently the most precise positioning system generally available to the general public and has significantly dropped in price in recent years. The GPS comprises a network of 24 satellites orbiting the earth. Each satellite transmits a ranging signal modulated on a 1.575 Ghz carrier. By monitoring the signal from a plurality of satellites, a GPS receiver can determine its position, i.e. latitude, longitude and altitude, to an accuracy of about 100 meters. In general, an aircraft would need to receive signals from four of the GPS satellites for an altitude measurement. More accurate signals are available to the military. Differential GPS, also available to the public, is more accurate than standard GPS, but requires an additional land based transmitter and special permission from the government.

Although many of the proposed GPS-based systems are simpler and cheaper than the TCAS presently in use which relies on transponders and interrogations, in areas of high traffic volume the number of transmissions and receptions which must occur can cause the systems to saturate. One notable effort to alleviate the problems of a GPS-based system is taught by "Traffic Alert and Collision Avoidance Coding System", U.S. Pat. No. 5,636,123 to Rich et al. In the Rich system, the airspace is divided up into a grid of volume elements. A collision avoidance signal is transmitted wherein the carrier signal is modulated by a psuedonoise code which is function of the volume element in which the aircraft is located. Each aircraft only tracks collision avoidance signals from vehicles in its own and immediate surrounding cells. Based on the calculated paths of the aircraft, a warning of an impending collision can be provided to the pilot.

In the opinion of the applicants, the Rich system suffers from a number of deficiencies. First, the signal they transmit is modulated by a pseudo random signature signal, called a "gold code", which needs to be received with expensive reconfigurable correlation receivers. The Rich systems transmit and depend on carefully chosen "gold codes" which are intended to produce distinct correlation peaks. The receiver has to be capable of searching for the signals. The requirement of complicated transmission and reception equipment frustrates the objective of having a system which is inexpensive enough to be generally available to the public. While there is perhaps less price sensitivity for aircraft, it has been demonstrated that the high cost of the TCAS has prevented its widespread adoption in noncommercial aircraft. Furthermore, as the reader with understand, the Applicants believe that the present invention has a more general applicability to land and water vehicles which have higher price sensitivity.

The volume elements proposed by Rich are rather coarse, on the order of 5 miles on a side. Despite a psuedorandom multiplexing feature when multiple transmitters transmit in the same cell, noise and other saturation effects can occur when there is too much traffic in the rather large volume element. The large volume element allows the Rich system to only look at the aircraft's element and those immediately adjacent. For some applications, it would be preferable to understand the vehicles present in an extended set of cells surrounding the vehicle. For example, it might be extremely difficult to use the Rich system as a central control facility. An airport control center, for example, may have a very difficult time reading signals from more distant volume elements with the vehicles in closer cells all transmitting simultaneously.

Although the Rich system uses the accurate GPS time to set the phase of their encoding signals, these can still be subject to delays from the speed of light propagation causing phase shifts. Their coding scheme causes "interference annuli" which prevent the craft from hearing each other at certain times. The system uses the GPS time as part of the input to the transmission process, but does not use it to prevent simultaneous transmissions.

This invention solves these and other important problems.

SUMMARY OF THE INVENTION

The location of machines in space is displayed in a three dimensional user interface. At each machine of a plurality of machines, the location of the machine is determined via a global positioning system calculation. Each machine, determining a cell corresponding to the GPS determined location. The machines broadcasting a message at a time slice allocated for the cell, wherein the message is indicative of the type of machine broadcasting. The machine which presents the interface receives broadcasted messages from the plurality of machines. Using the received broadcasted messages, it determines the locations of the plurality of machines. Next, the presentation machine chooses a representation of each machine according to a machine type. Finally, the user interface is constructed by orienting and presenting the representations within a user interface showing a volume of space according to the determined locations.

BRIEF DESCRIPTION OF THE DRAWINGS

The foregoing features, advantages and aspects of the invention will be better understood with reference to following detailed description which describes the accompanying drawings wherein:

FIG. 4B shows a minicell formula.

FIG. 10 shows a data store used to present the interface depicted in FIG. 8.

DETAILED DESCRIPTION OF THE DRAWINGS

Figure 1:
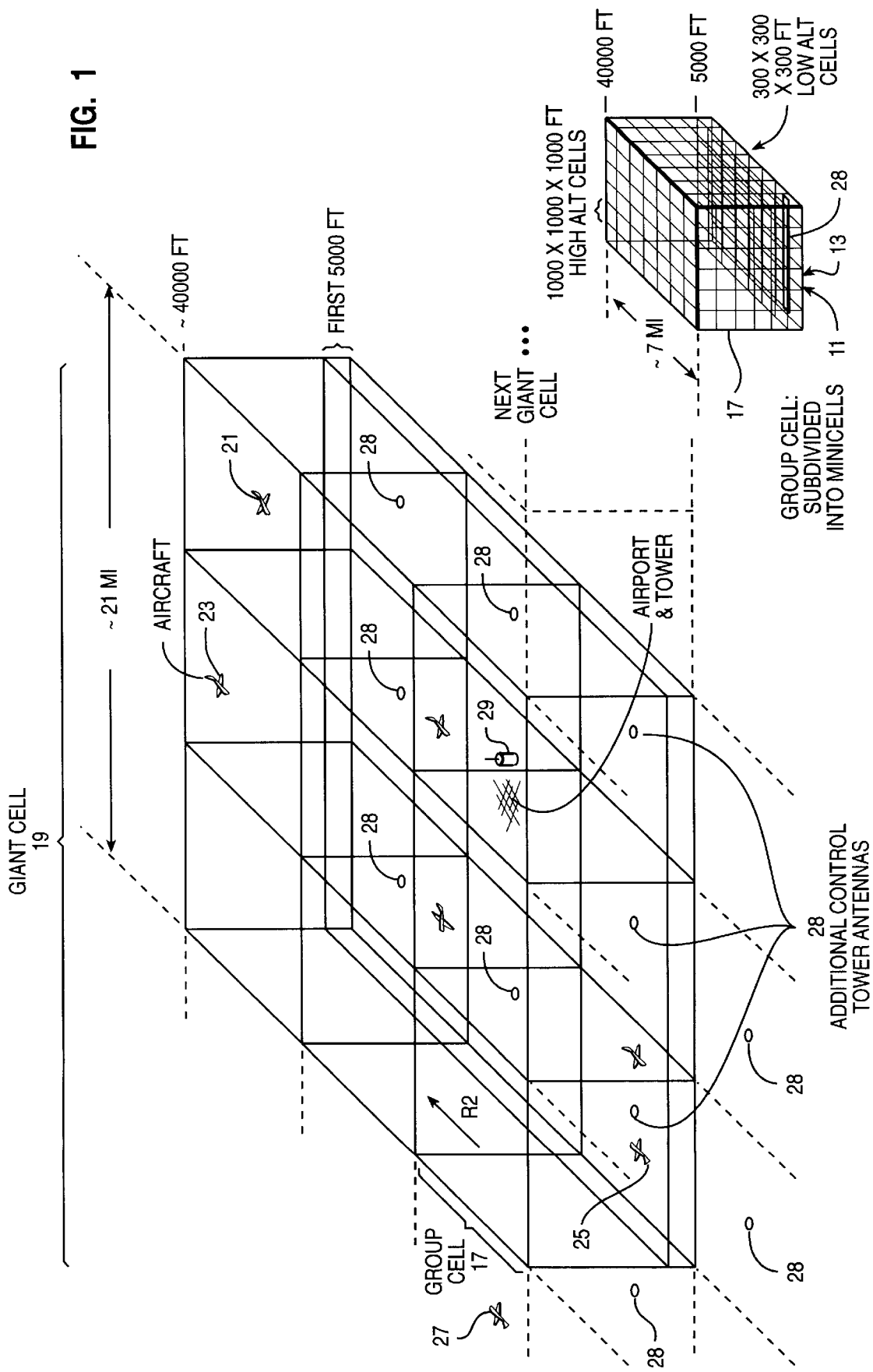
FIG. 1 is a pictorial view of a plurality of aircraft operating in an airspace that has been partitioned into a hierarchy of cells according to present invention and an airport controller monitoring movement of the plurality of aircraft.

As mentioned above, many vehicles such as automobiles, aircraft and boats have GPS receivers. The Time Multiplexed GPS based Cell Location Beacon System (hereinafter "TCELL") proposed by this invention makes use of the GPS receiver for determining the location of a vehicle such as an aircraft. The TCELL system also uses the GPS clock to avoid transmission collisions in time. The embodiment shown in FIG. 1 shows a three dimensional airspace divided into a hierarchically organized set of cells. For ease in illustration, the cells are shown as cubes. However, the three dimensional space can be divided into any multihedral or semispherical shape which can be tightly packed, i.e. there is no space which is not allocated to a cell, within the application space. In fact, more nearly spherical shapes are preferred. Also, for ease of illustration, only a limited portion of the airspace is shown. The TCELL system aboard each aircraft would contain information relating to a large area, preferably the entire surface of the earth. The first level of the hierarchy is called a "minicell". As shown in FIG. 1, minicells 11, 13, 15, for example, having radius R1, are relatively small and measured in one to a few hundreds of feet. The aim in constructing the size of the minicell is to have a single vehicle in a minicell. If two aircraft are occupying the same minicell, they have effectively collided. As the aircraft fly through space, they continually determine their position via GPS and determine which minicell they are in by reference to a minicell directory.

The next level of the hierarchy is called a "group cell". A semispherical collection of minicells forms a group cell 17, having radius R2. The group cell diameter is approximately the range of the weak TCELL transmitter. The number of minicells within a respective group cell will depend therefore on the size of the minicell and the strength of the TCELL transmitter.

The highest level is called a "giant cell" 19. A group cell and all of its immediate neighbors forms a giant cell with a radius of 3*R2. In the diagram, the each giant cell is comprised of 9 group cells, although this can differ depending on the base shape used for the cells. Further, the base shape for the minicell can be different from that used for the group and giant cells. Within each giant cell, each minicell is linearly enumerated and mapped onto a small time slice in an n second repeating unit of time exactly specified by the GPS clock. The small time slice is at least the amount of time that a signal would propagate across a giant cell. For a 20 mile giant cell this time would be slightly more than 100 microseconds. Thus, the minicell in which the vehicle finds itself in determines when the vehicle is allowed to transmit its location data. It is worthwhile to note that respective minicells within different giant cells will transmit at the same GPS time. However, because of attenuation, speed of light effects and/or frequency use respective TCELL receivers will not be confused or overwhelmed.

Each vehicle 21, 23, 25, 27 has a weak TCELL transmitter capable of transmitting a signal approximately with a range of 2*R2 to the receiver of a specified sensitivity. That is, in the optimal situation only vehicles within the immediate group cell can receive the signal. Each TCELL transmitter sends a burst of data during the time slice and on the frequency determined by its location, i.e. which minicell it is in. Ideally, each vehicle will also have a TCELL receiver for listening for signals from other vehicles in the surrounding airspace. The vehicle receiver can also be designed to filter out signals below a certain signal strength threshold to improve the discrimination of close and far vehicles.

As will be appreciated by the skilled practitioner, there is a balancing act between the size of the minicell which is a factor of the vehicle characteristics such as size and speed as well as the number of minicells in giant cell. The size of the minicell is also strongly influenced by the propagation time for the TCELL signal across a giant cell and the number of channels used by TCELL system. Each minicell within a given giant cell is allotted a time slice of an overall repeating time period. The time slice must be large enough for each transmitter to transmit the required information and allow the signal to propagate the diameter of a giant cell. Where multiple frequencies are used, the time slices allocated to each frequency are independent of although comparable in duration to the time slices allocated for any other frequency. In the multiple frequency case, minicells within the same giant cell will use the same time slice on different frequencies. Therefore, there can not be too many minicells within a giant cell.

One skilled in the art will appreciate that operating parameters can vary as will be shown in some alternative embodiments below. However, for a preferred embodiment in which aircraft transmit at a frequency of 10–15 GHz, an appropriate minicell size is 100 meters in diameter below 5000 feet. Since aircraft above 5000 feet are fewer in number and are flying faster the minicell size can be increased to 300 meters in diameter at altitudes from 5000 feet to 8 miles in altitude. The group cell size is close to 7 miles in diameter and the giant cell size is 20 in diameter. This translates into 2.1 million minicells being in a giant cell. Figuring a periodicity of 10 seconds between transmissions for a particular aircraft, this allows 30 microseconds for each TCELL transmitter to send a 150 bit message on one of 20–25 channels. Within its allotted 100 millisecond time slot, each vehicle can transmit its vehicle ID, vehicle type, location, direction of travel and speed, and the frequency to which its audio receiver is tuned. Any other TCELL receiver in the area listening to TCELL transmissions can thus determine the location of the vehicle without transmitting a signal to the vehicle unlike the FAA TCAS.

In other embodiments of the invention, as noted below further separation of signal by having vehicles within a given giant cells transmit at different frequencies is unnecessary. In the aircraft case, there are a relatively large number of minicells and a requirement that each aircraft signal at a relatively high frequency. Where there are fewer minicells and the vehicles do not need to transmit at different frequencies a single frequency can be used. Furthermore, although the specification of weak transmitters allows for an inexpensive system, a weak transmitter, i.e. one which can transmit only across a group cell, is not a necessary feature of the invention. With stronger transmitters, vehicles within one giant cell can transmit at a different frequency than those within a second giant cell. As the vehicle goes from giant cell to giant cell, the TCELL transmitter and possibly receiver as well will automatically switch to respectively transmitting and listening at the appropriate frequencies.

In some embodiments, the respective receivers within a TCELL system may have different sensitivities, i.e. TCELL receivers for a central monitoring facility may elect to receive more TCELL transmitters, possibly at different frequencies, than the TCELL receivers in the vehicles themselves. For example, the TCELL receivers in aircraft 21, 23, 25 and 27 may receive only the frequencies assigned to giant cells in the immediate vicinity of the minicell in which the aircraft are located as they are primarily interested only in collision avoidance. However, the TCELL receiver for the aircraft control tower 29 may elect to receive across a greater number of frequencies to obtain a greater picture of the airspace under its control. As the transmitting frequencies may be restricted for TCELL use, the TCELL receiver for the control tower 29 may simply be more sensitive or set to a lower signal threshold than the aircraft TCELL receivers to obtain a greater range of information. In the case of an aircraft control center, remote antennas 28 can receive the signals from remote giant cells which can be transmitted by other means to the control center so that a comprehensive map of the area can be developed.

The air traffic control application of the invention, either to replace or augment the existing TCAS, has a number of possible features. In one preferred embodiment of the invention, the cell size of the minicells varies according to the anticipated traffic levels or the speed of vehicles in a given area. The minicell size in a congested area, e.g., surrounding an airport is smaller than that over an unpopulated area such as an ocean. Increasing the size of the minicells at high elevations allows more efficient use of bandwidth. Further, the size of the giant cells around an airport can be reduced, allowing the aircraft to transmit more frequently since there will be fewer minicells within a given giant cell. The multiple frequency version of the TCELL system is preferred where the cell size varies across terrain. However, the power to the TCELL transmitter and threshold of the TCELL receiver can also be varied to match varying group and giant cell sizes.

The air traffic control tower can detect aircraft by other means, e.g., TCAS. The air traffic control tower TCELL transmitter can then broadcast a TCELL message for those detected aircraft at the appropriate time slice. That is, the TCELL message is transmitted at the time slice allocated to the minicell in which the aircraft is located. In addition, the air traffic control tower can broadcast TCELL messages for known obstructions such as antenna towers, weather balloons or mountains. In this way, the displays of the TCELL systems in the aircraft will always warn their pilots to avoid these areas.

Finally, the air traffic control tower can broadcast a TCELL message for transitory phenomena such as severe thunderstorms, wind shears or tornadoes. This information would be typically be obtained from another means such as Doppler radar. Nonetheless, it would be very useful to present on the same display as the TCELL data.

There are two ways of viewing the minicell/group cell/giant cell hierarchy. The first is an absolute view which is stored in the minicell directory or calculated by the minicell formula. According to the directory or formula, the entire world is mapped into minicells and on the basis of the giant cells in which the respective minicell is located, the TCELL system is assigned a time and possibly a frequency in which to transmit. The second is a relative view where the group cell and giant cell are comprised of that collection of minicells within a respective distance of R2 and 3*R2 from the minicell in which the vehicle is located. The relative group cell and relative giant cell may be comprised of portions of a plurality of absolute group cells and absolute giant cells found in the minicell directory. The time slots allocated to minicells according to the absolute giant cells in such a way that no minicell in either an absolute giant cell or a relative giant cell is simultaneous with any other minicell in the respective absolute or relative giant cell.

Figure 2:
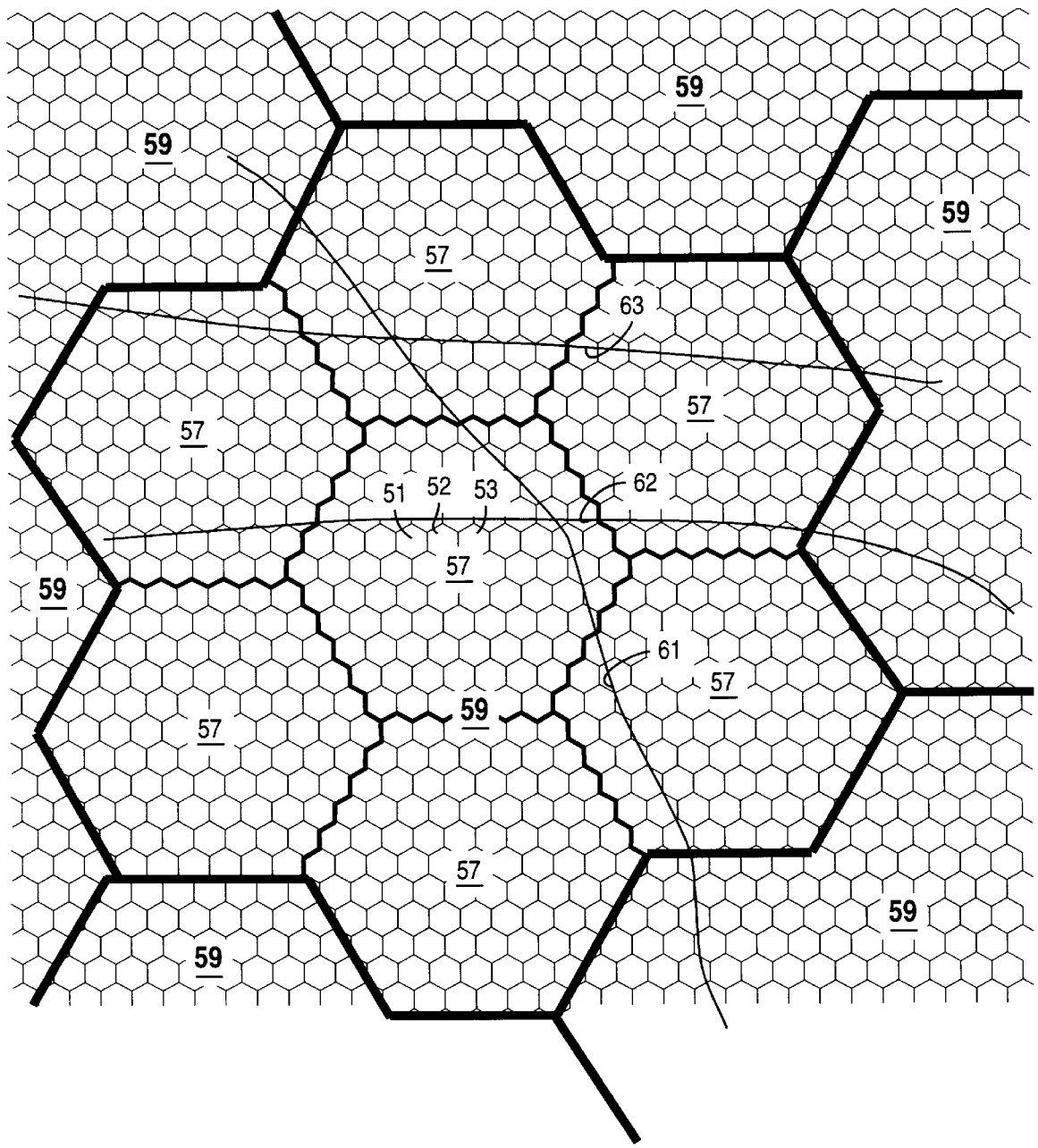
FIG. 2 is a pictorial view of a plurality of land vehicles operating on a surface which has been partitioned into a hierarchy of two dimensional cells according to the present invention.

In FIG. 2, a pictorial view of a plurality of land vehicles 61, 62, 63 operating on a surface which has been partitioned into a hierarchy of two dimensional cells according to the present invention. In this embodiment, the land surface is divided into hexagonal minicells, group cells and giant cells. Altitude is ignored. As with the aircraft embodiment, a plurality of minicells, for example 51, 53 and 55, having a radius R1, are contained within a group cell 57, having radius R2. A giant cell 59 having radius 3*R2 contains 7 group cells if the hexagon shape is maintained for the group cells. As shown in the figure, the giant cell shape is different, however, the choice could have been made to change the outer group cell shape and keep the giant cell shape as a hexagon. The characteristics of the minicells, group cells and giant cells are similar to that described above in terms of assigning time slots and transmitter strength.

For an automobile transmitting at a frequency of 300 MHz, an appropriate minicell size is 30 feet diameter. For this minicell size, differential or military quality GPS needs to be used. The group cell size is 330 feet diameter and the giant cell size is 1000 feet in diameter. This translates into about 644 minicells being in a giant cell. Figuring a periodicity of 30 seconds between transmissions for a particular automobile, this allows 30 milliseconds for each TCELL transmitter to send a 150 bit message on a 10 kHz bandwidth. Within its allotted time slot, each vehicle can transmit its vehicle ID, vehicle type, location, direction of travel and speed, and the frequency to which its audio receiver is tuned. Any other TCELL receiver in the listening area can thus determine the location of the vehicle.

The land based embodiment of the invention is thought to be useful for a variety of purposes including collision avoidance, traffic control, traffic light control and fleet control. The 30 second periodicity would be adequate for the latter purposes, it is likely that a higher periodic rate would be desirable for collision avoidance. The higher periodic rate could be achieved by making the giant cell smaller at the same 10 kHz bandwidth or use of multiple frequencies.

Figure 3:
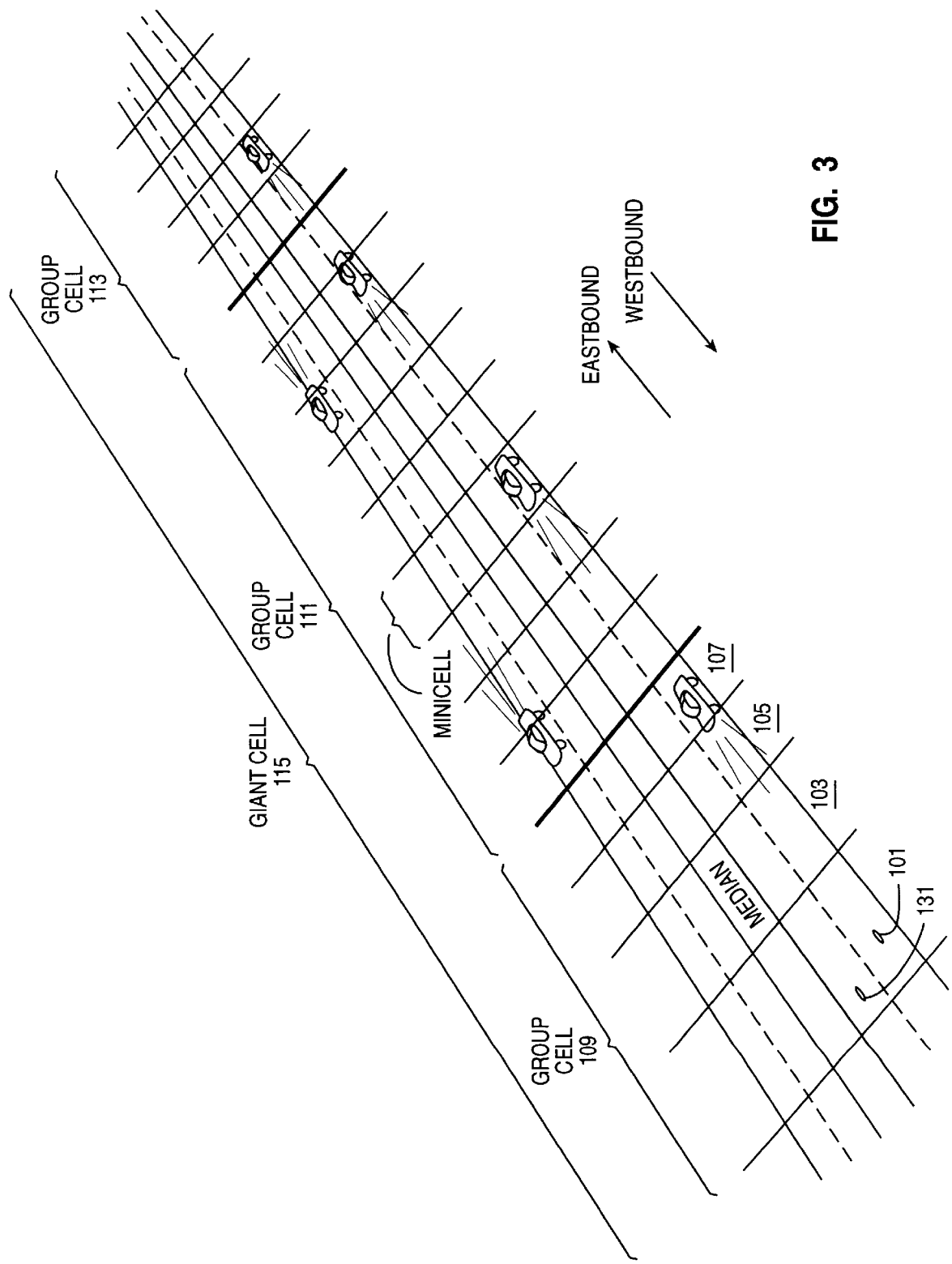
FIG. 3 is a pictorial view of a smart road which has been partitioned into a hierarchy of cells according to the present invention.

In FIG. 3, a "one dimensional" version of the TCELL system is shown along a smart road. In this embodiment, each lane is assigned a plurality of minicells, group cells and giant cells. For example, lane 101 comprises minicells 103, 105 and 107 which are in group cell 109. Group cells 109, 111 and 113 make up giant cell 115. Alternatively, both lanes 101 and 121 for a given direction of traffic may contain minicells all of which belong to group cell 109. Each lane can be given a different frequency or set of time slices. This alternative is considered one dimensional as well since the predominant direction along which the minicells are arranged are along the roadway.

The invention in this embodiment provides a "smart road" without any costs associated with burying cable and transmission media in the roadway. Each roadway or direction of the roadway can be assigned is own frequency on which the TCELL transmitters and receivers to communicate. Since restricting the minicells to the roadway itself greatly reduces the number of minicells, the periodicity at which each TCELL transmitter can transmit is greatly increased. Using the same parameters as discussed above in the two dimensional embodiment, each TCELL transmitter can transmit once a second using the same bandwidth.

The reader will note that the invention may be described in terms of listening, selecting, comparing, determining or other terms that could be associated with a human operator. The reader should remember that the operations which form the invention are machine operations processing electrical signals to generate other electrical signals.

As compared to the FAA system, the TCELL system eliminates the need for a radar sending information to all neighboring vehicles to trigger their transponders. It also eliminates transmission collisions, unless two vehicles are in the same minicell. The TCELL system gives much more accurate position information than radar. Further, the giant cell/group cell/minicell hierarchy allows time slice and frequency assignment reuse. As compared to the Rich system, TCELL uses a much more refined cell system; their volume elements are much more coarse (5 miles vs. 30 feet or less depending on which differential GPS is used). The TCELL system give a view to an extended set of surrounding cells with essentially only one vehicle per cell. The Rich system only looks at the cell of the vehicle and the adjacent cells. The TCELL hierarchy of cells eliminates signal crosstalk which can be a problem in the Rich system. The prior art system can have multiple transmitters transmitting simultaneously in the same cell which can cause noise problems and other difficulties when there is too much traffic in the rather large volume element. TCELL transmits the velocity vector so that the receiver does not need multiple receptions to compute the target's projected path. The Rich system is designed for collision avoidance in three dimensional space. There is no discussion about using their system in 2D or 1D modes for automobiles, and furthermore, their volume element size, receiver cost, would not make it appropriate for these uses. Further, the various embodiments of the TCELL system discussed above, very low power transmitters in range of 10–50 milliwatts can be used keeping the costs of the system very low relative to the prior art.

Figure 4A:
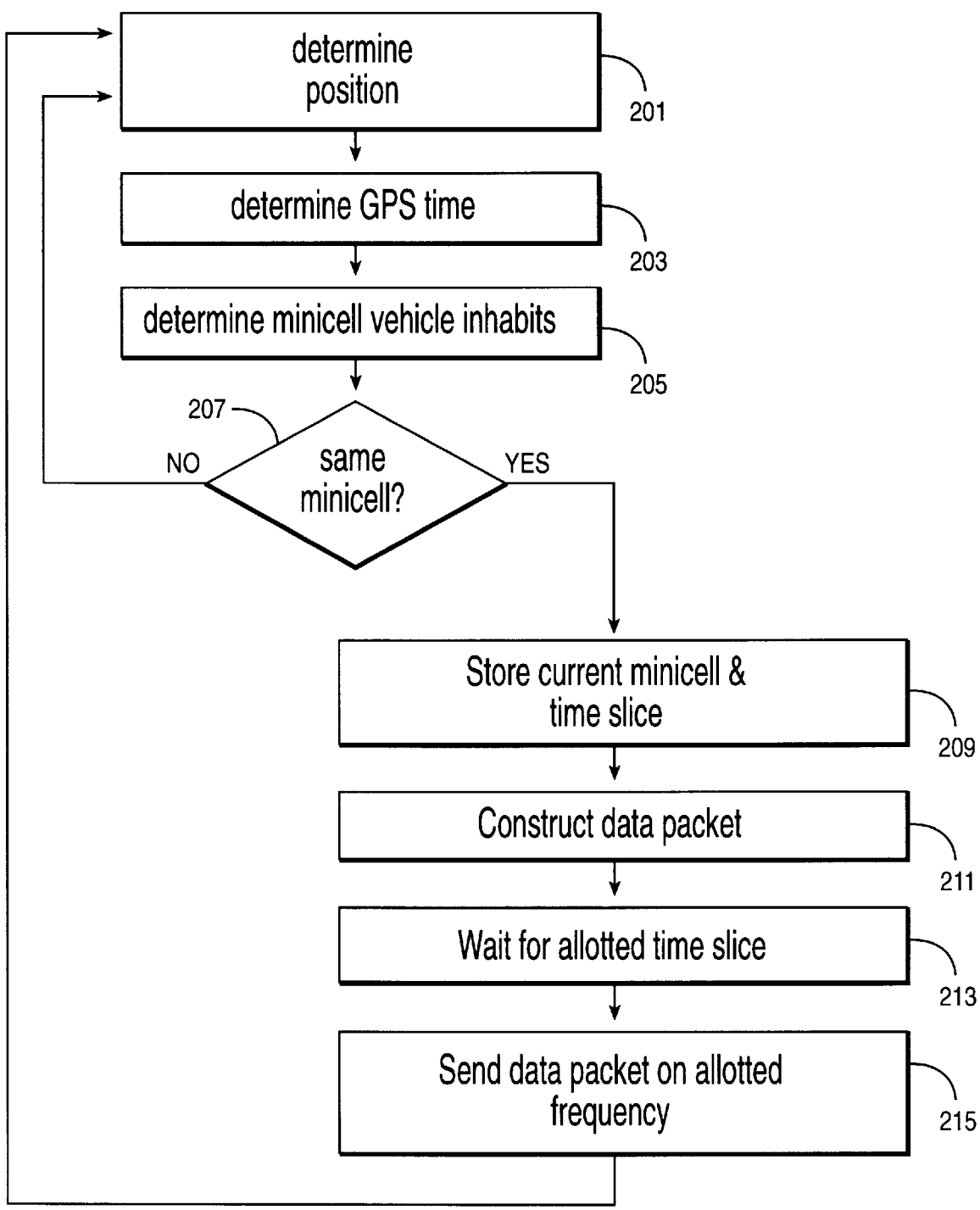
FIG. 4A is a flow diagram for transmitting the location of a vehicle according to the present invention.

In FIG. 4A, a flow diagram of the transmission procedure for a TCELL transmitter located at a respective vehicle. The transmission procedures at each vehicle are similar; those for aircraft, sea and land vehicles will typically vary according to cell size, time slice and assigned frequency, but are otherwise similar. In step 201, the TCELL system in the vehicle determines its position, e.g., latitude, longitude and altitude using a GPS receiver. If a differential GPS system is used, a high accuracy in altitude is usually attained. However, the altitude accuracy for the NAVSTAR GPS is typically not as good as from a barometric altimeter so that the altitude measurement can be refined using the reading from such a device. In the two and one dimensional cases, altitude is ignored.

At step 203, the TCELL system determines the GPS time as defined by the signal received from the GPS satellites. At step 205, the TCELL system determines which minicell it is in by reference to the minicell directory or minicell formula and its calculated position. Preferably, the minicell directory and formula are an integral parts of the TCELL system. However, in the event of changes to the minicell system or in an area for which the TCELL system does not have a directory, it can be downloaded from a central authority. Generally, this would occur over a wireless transmission medium. Also, from the minicell directory or formula, the TCELL system would determine the time slice and frequency in which it was allowed to transmit. For reasons of minimizing memory requirements, the use of a minicell formula is preferred. However, there may be special cases, e.g., around Denver or other high altitude cities, a minicell assignment other than the general formula is preferred. The special cases can be stored within by the minicell directory.

In step 207, a test is performed to determine whether the calculated minicell varies from the last calculated minicell by a predetermined amount. In general, the aircraft should be in the same or a proximate minicell from the last reading. If the minicell varies by more than the predetermined amount, the process cycles back to confirm the reading. In step 209, the current minicell and time slice are stored.

In step 211, a TCELL message is constructed. The message comprises data such as vehicle ID and type, XYZ position as longitude, latitude and altitude, heading as pitch, yaw, and roll, speed, frequency that the audio receiver of the vehicle is tuned and a check sum for error correction. At step 213, the TCELL transmitter waits until its allotted time slice occurs. At step 215, the TCELL message is sent during the allotted time slice for the minicell. The process returns to step 201 where the vehicle's position is updated according to the signals received by the GPS receiver.

One minicell formula for a three dimensional embodiment is shown in FIG. 4B. As is shown, the cell number of the minicell is a function of the x coordinate, the y coordinate and the Z coordinate as well as the dimensions of the giant cell and number of minicells in the giant cell. Using the calculated cell number divided by the number of time slots available in the giant cell the remainder is used to calculate the time slot number. However, this formula is merely illustrative. Many other minicell formulas can be devised and used by the present invention.

Figure 5:
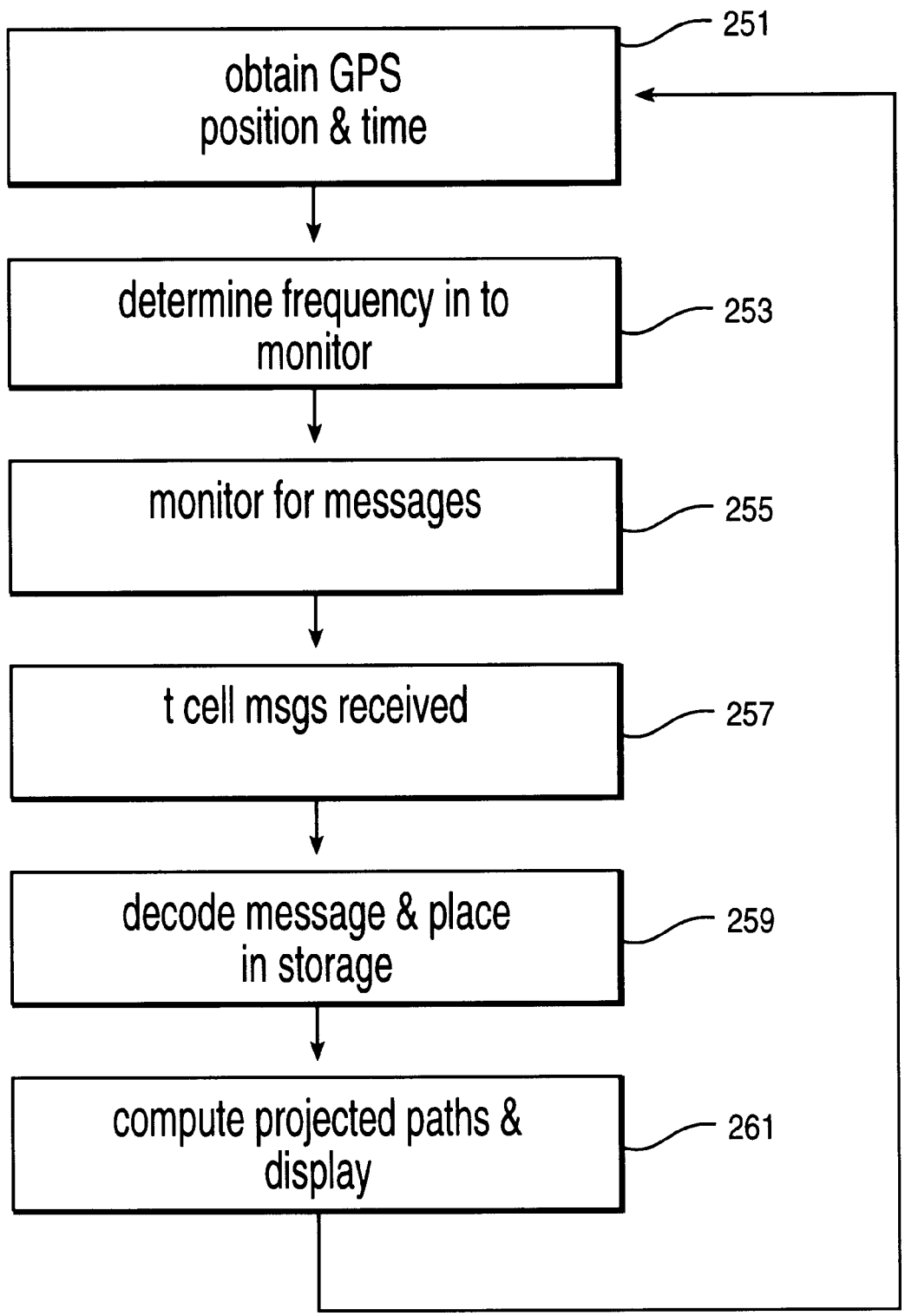
FIG. 5 is a flow diagram for receiving the transmitted location messages from a plurality of vehicles operating within the hierarchically divided space.

FIG. 5 is a flow diagram for receiving the transmitted location messages from a plurality of vehicles operating within the hierarchically divided space. Naturally, for the TCELL system to be most effective as a collision avoidance system, each vehicle should not only contain the TCELL transmitter, but also a TCELL receiver. It is possible for tracking purposes only, e.g., an air traffic control situation that only a few TCELL receivers are in use. In the event of an impending collision, the air traffic control tower could warn the approaching aircraft of their relative positions and give instructions for avoidance over the audio channel include in the aircraft's TCELL messages.

In step 251, the GPS position and time are calculated. Once the GPS position is determined, the minicell directory is consulted in step 253 to determine which frequencies should be monitored. These steps may be eliminated for stationary receivers or in embodiments where the frequencies in use do not vary across giant cells. Next, a monitoring step 255 is entered. It monitors for TCELL messages across the entire time period for the giant cell in which the TCELL receiver is located for a given number of periods. As it is unlikely that the vehicle will be traveling through giant cells at a great rate, several time periods can be monitored before the TCELL receiver should need to change frequencies. Next, in step 257, a TCELL message is received. In step 259, the message is decoded and the data therein is placed in the vehicle tracking database, including the vehicle ID, vehicle type, position, bearing and speed. Although not shown, error checking using the check sum or checking the time slice in which the TCELL message was received against the information in the message can be performed at this time. The information in the vehicle tracking database is used to generate a display to the operator of the TCELL system, step 261. One preferred interface is discussed below with reference to FIGS. 8, 9 and 10. After a predetermined number of time periods has elapsed, the process returns to step 251 to calculate the vehicle's position.

Figure 6A:
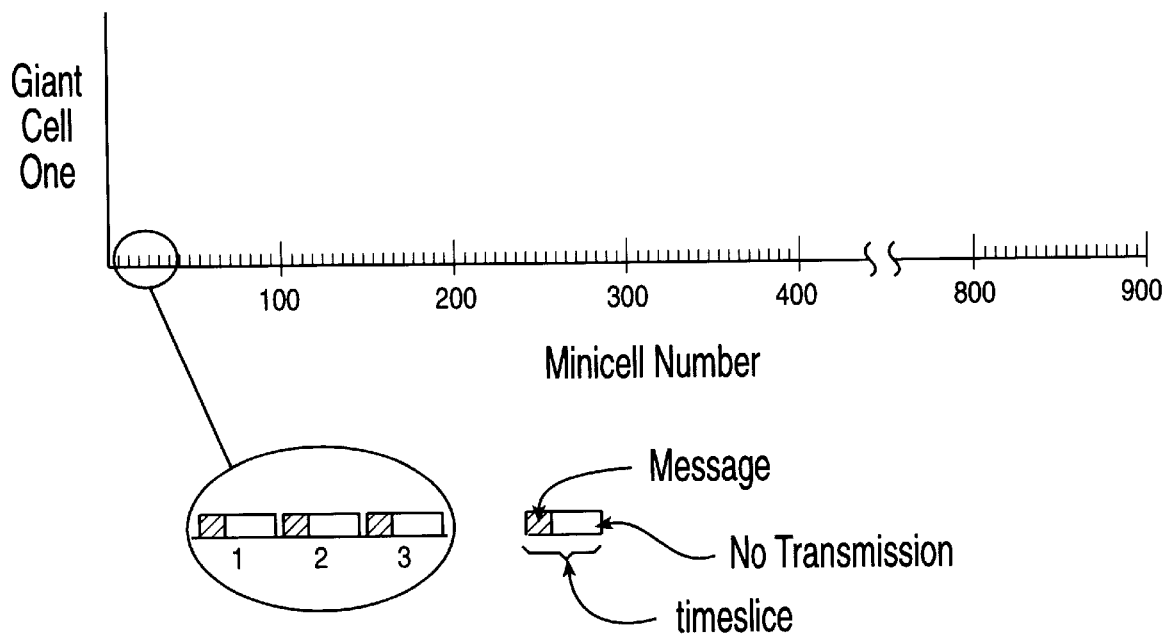
FIGS. 6A and 6B are diagrams showing the allotted time slices for respective minicells with a two dimensional hierarchy.
Figure 6B:
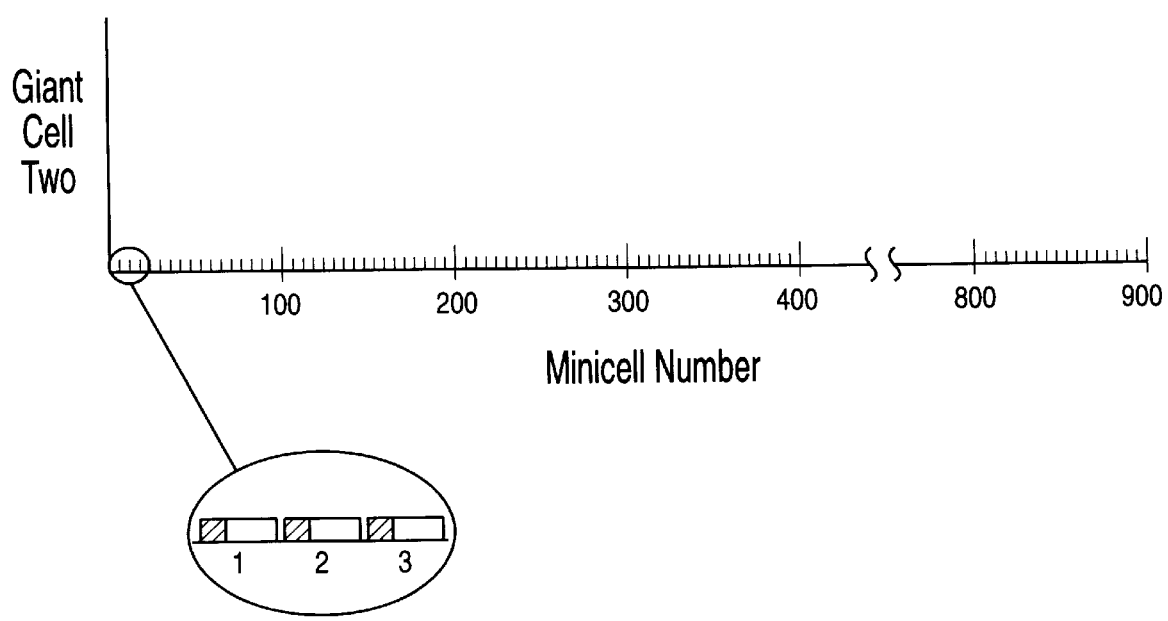

FIGS. 6A and 6B show the allotted time slices for two adjacent giant cells. Each giant cell contains 900 minicells which for the sake of illustration are allotted time slices in numeric order on a single frequency. However, as those skilled in the art would recognize other orders and additional frequencies are possible. The reader can imagine that each giant cell contains nine group cells arranged in a two dimensional plane each of which contains 100 minicells. Within each giant cell, the group cell to the northwest contains minicells 1–100 numbered left to right, the group cell due north contains minicells 101–200, the group cell to the northeast contains minicells 201–300 and so forth. Minicell 1 in giant cell 1 has the same time slice as minicell 1 in giant cell 2 and so forth. For a minicell in the central portion of the absolute giant cell, e.g., minicell 445, only messages from vehicles in minicells in its giant cell will be received, e.g., minicells 401–500.

However, for a vehicle at the periphery of an absolute giant cell, e.g., minicell 550, messages from minicells 505–510, 515–520, 525–530, 535–540, 545–549, 555–560, 565–570, 575–580, 585–590 and 595–600 from its own absolute giant cell will be heard as well as messages from minicells 301–305, 311–315, 321–325, 331–335, 341–345, 351–355, 361–365, 371–375, 381–385, 391–395 in the adjacent absolute giant cell. More examples could be given, but the reader will appreciate that from any one minicell, the messages from received from nearby minicells will have their own time slice. Signals from distant minicells which share a time slice with nearby cells will have attenuated sufficiently so that if they are received at all, they will be easily distinguished.

Figure 7:
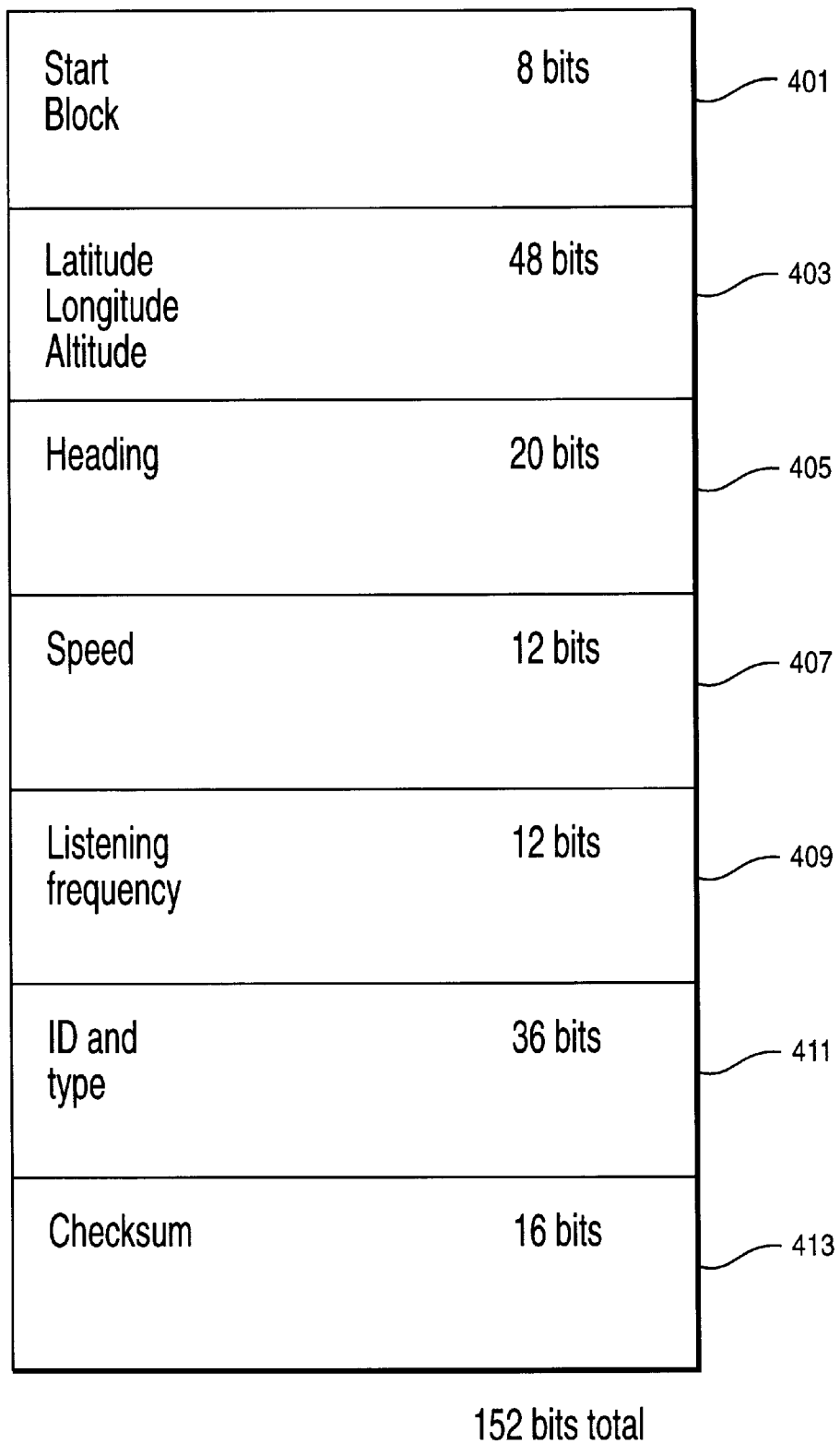
FIG. 7 shows a sample message for the aircraft embodiment of the invention.

FIG. 7 shows a sample message for the aircraft embodiment of the invention. In this example, the message is 152 bits long. With a transmission of 9600 baud, the message takes approximately 16 milliseconds to transmit. The TCELL system requires some time to transition from the listening to transmitting mode so a start block 401 of eight bits is included. The next 48 bits 403 includes position information, e.g., latitude, longitude and altitude. The next 20 bits 405 includes the heading data, e.g., azimuth and inclination. One skilled in the art would readily appreciate the position and heading information can be expressed in a variety of different ways. The next 12 bits 407 includes the speed data. Next, 12 bits 409 are used for the audio frequency data representing the radio frequency at which the vehicle can be contacted. The next 36 bits 411 are used for transmission of additional data such as the vehicle ID and vehicle type as may be required. The checksum used for error checking is stored in the last 16 bits 413.

The time slice has to be longer than the time that it takes for the signal to propagate across the giant cell. For a twenty mile wide giant cell, this translates to about 100 microseconds. A high frequency transmitter operating at 10 GHz, for example, provides line of sight, allows for weak propagation and allows for transmission at a high rate of data transmission.

Figure 8:
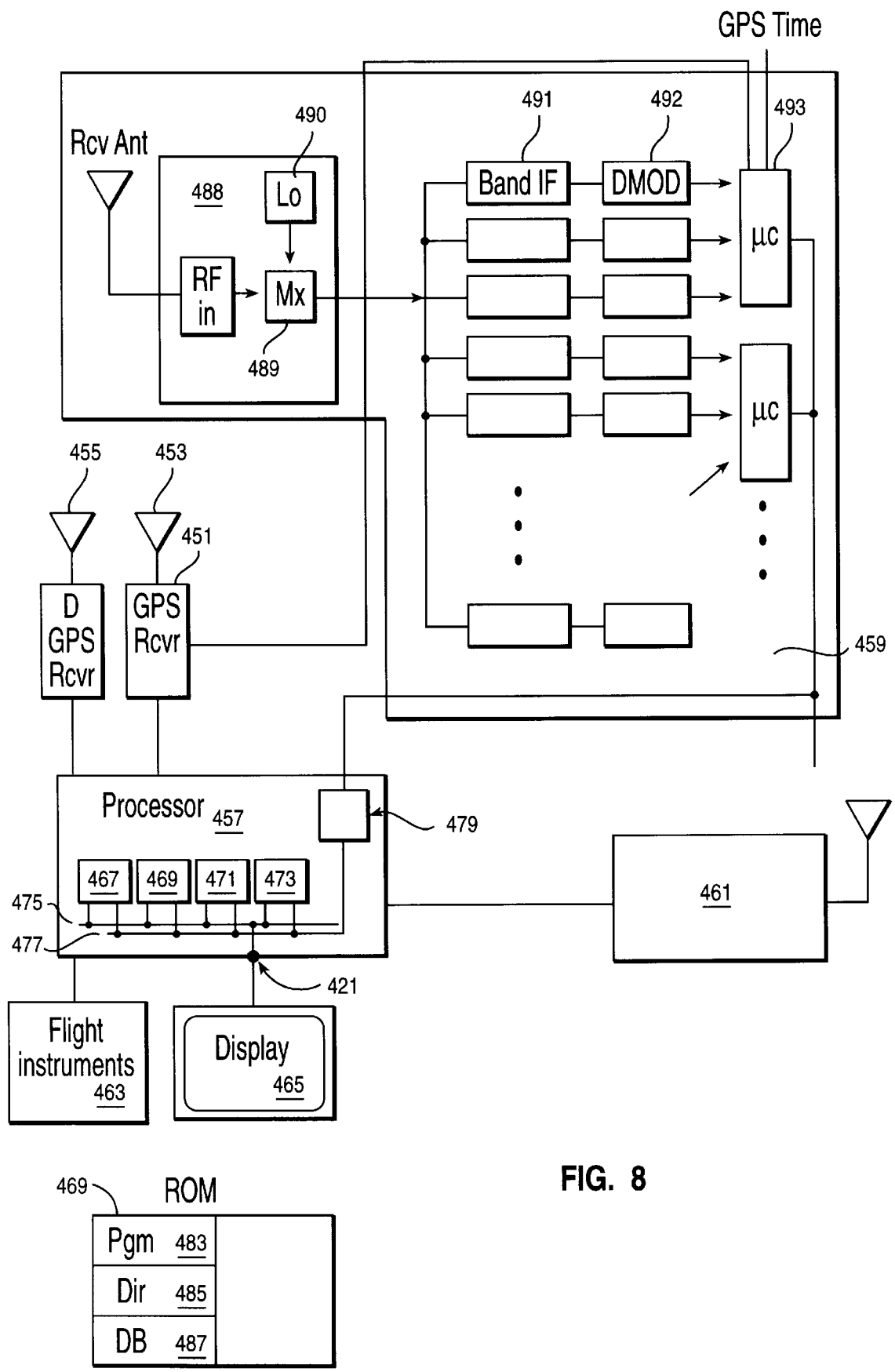
FIG. 8 is a block diagram of the TCELL system suitable for an aircraft or land or sea vehicle.

FIG. 8 is a block diagram of the TCELL system suitable for an aircraft or a land or sea vehicle. As shown in the figure, a GPS receiver 451 includes GPS antenna 453 and possibly a differential GPS antenna 455 and differential GPS receiver 456 are coupled to the TCELL processor 457. As mentioned above, the GPS receiver 451 may have other inputs from a barometric altimeter (not shown). The GPS receiver 451 and TCELL processor 457 communicate position and time information. The TCELL processor 457 is in turn coupled to the TCELL receiver 459 and TCELL transmitter 461. The TCELL processor 457 is also coupled to the flight instruments and controls 463 which provide heading and velocity information. Optionally, this information can be established from calculations using the GPS position and time data. The TCELL processor 457 is also coupled to a display 465 which presents a user interface to the operator of the vehicle.

The TCELL processor 457 comprises a microprocessor 467, a ROM and RAM 469, a persistent memory 471, e.g., ROM, and a timer circuit 473 all coupled to and communicating via a data bus 475 and an address bus 477. Communication with the TCELL receiver 459 and TCELL transmitter 461 is accomplished by means of a serial I/O interface 479. Control of the display 465 is performed by a video adapter 481. The timer circuit 473 which keeps track of the time slots is fed the time data from the GPS receiver 451.

The RAM 469 contains the TCELL program 483, cell directory and/or formula 485 and the vehicle tracking database 487 when executing. The TCELL program 483 receives the data from the GPS receiver, TCELL receiver and other inputs, analyzes the data, constructs a TCELL message and instructs the TCELL transmitter when to send the TCELL message. In a multiple frequency embodiment, the TCELL receiver has a front end 488 with a mixer 489 and a local oscillator 490 which picks up a band of frequencies, e.g., a 200 MHz bandwidth. Assuming that there are 20 channels, each channel has a tuner, a bandwidth IF 491, which is tuned to a respective 10 MHz band. This is coupled to a demodulator 492 which is in turn coupled to a microcontroller 493. Each microcontroller 493 processes the TCELL signals received on the channel for use by the TCELL processor 457.

Figure 9:
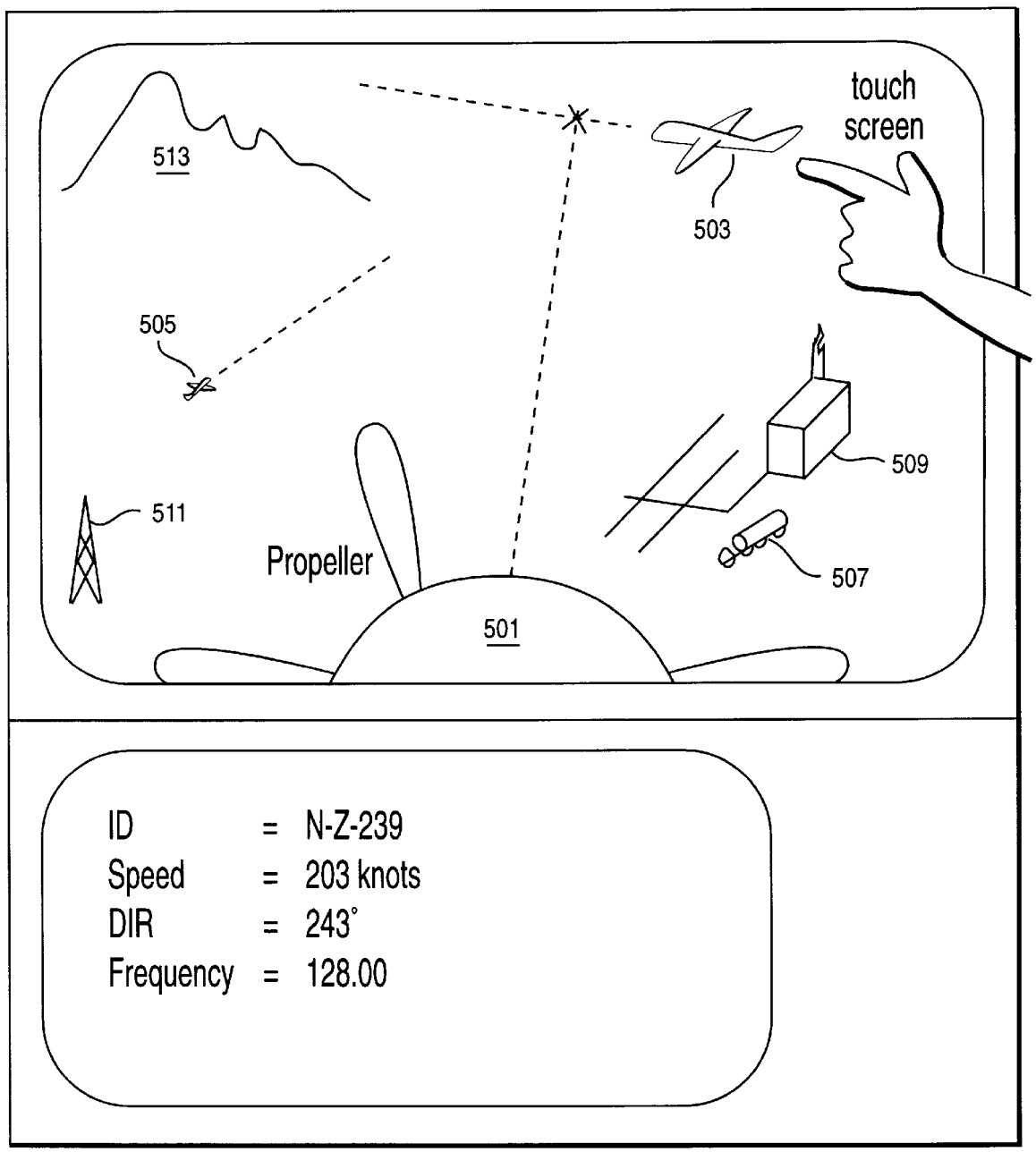
FIG. 9 shows a three dimensional user interface in which vehicles operating in the hierarchically divided space are presented to the user.

While there are many user interfaces which the TCELL system could potentially show to the user, FIG. 9 shows a preferred embodiment of a three dimensional user interface in which specialized graphical icons representing vehicles operating in the hierarchically divided space are presented to the user. This interface is not limited to TCELL, but can be used in any similar location system in which the vehicles and objects detected can be classified as to type.

At the center of the interface, an airplane icon 501, represents the operator's vehicle which in the present example is a small non-commercial plane. The icon can vary according to the vehicle type in which the TCELL system or may be merely represented by a point. The placement of the airplane icon 501 does not necessarily have to be at the exact center of the display. As the operator may be more interested in vehicles and objects in the direction in which he is traveling, more display space can be devoted to that space.

Other vehicles detected by the TCELL system are also represented. A large commercial airliner 503 and a second small commercial plane 505 are also detected in the group cell airspace. Note that the representation of the commercial airliner 503 and small plane 505 are preferably accurate representations of the actual aircraft, or at least general pictures of a commercial airliner and small aircraft. This allows the pilot to gain an understanding of what craft have been detected by the TCELL system. Also shown is fuel truck 507 near the air traffic control tower 509. This illustrates that in some embodiments of the invention, different types of vehicles can be linked into the same overall TCELL system. Also shown is TV antenna 511 and mountain 513. The tower 509, antenna 511 and mountain 513 are stationary objects, i.e. not only vehicles can be represented in the interface. The tower 509 will have its TCELL transmitter, but as mentioned above the antenna 511 and mountain 513 do not. Their TCELL messages are supplied by the tower for presentation by the nearby aircraft.

Preferably the icons which represent each detected vehicle 503, 505 and 507 are oriented in the direction in which they respectively travel. This information is available in the TCELL message. This makes it more intuitive to the pilot as to which vehicles are most likely to pose a potential collision threat. There is a great deal of existing art on how to rotate a representation of a three dimensional object. Given the basic form, graphic hardware or software can perform the translation. Alternatively, several icons of the same craft can be stored in different orientations and the most appropriate chosen according to the sensed direction.

Supposing that the airliner icon 503 was oriented such that it appeared to the pilot as though it might pose a possible threat. The icon 503 could be selected through an input device such as keyboard, pointing device or voice input. A touch input device overlaying the TCELL screen would be especially convenient. Once selected, a panel 515 showing text information such as vehicle ID, vehicle type, present speed and direction and audio frequency can be shown. This information is also available in the TCELL message. A projected path 517 can also be displayed. This information, together with a projected path 519 of the operator's vehicle can be used to show possible collisions. Evasive action or contacting the pilot of the other aircraft can be undertaken as appropriate.

In a preferred embodiment of the invention, a true three dimension interface is shown. Aircraft appear to float at the altitude at their indicated altitude, while ground based objects are portrayed below. Representative terrain can be displayed based on the operator's GPS position. Some of the information is readily available from the TCELL system. Some may not be. A ground based vehicle is likely not to send an altitude as part of its TCELL message. However, the display system can make the reasonable assumption that it is located on the ground.

FIG. 10 shows a data store used to present the interface depicted in FIG. 8. In the data store, a plurality of entries for vehicle types are shown. Each vehicle type is associated with one or more icons, or pointers to icons. The appropriate icon is chosen based on the vehicle type. If there is no icon for the vehicle type which was sent as part of the TCELL message, an appropriate default icon is chosen. For example, suppose that a new model of airplane was identified by a vehicle type unknown to the TCELL system. The vehicle type will not match any of the stored icons. However, because the TCELL message contains altitude information as well as speed and direction information which is consistent with an aircraft, a default airplane icon will be chosen by the system.

In the table, listings are found for commercial jets, e.g., Boeing 747, McDonnell-Douglass-80, and a default commercial jet icon, as well as listings for private planes such as a Lear jet, Cessna and a default private jet icon. In the actual data store, many more listings could be present. Also in the table are listings for a truck, and an air traffic control tower as well as mountain, TV antenna and severe thunderstorms.

Figure 11:
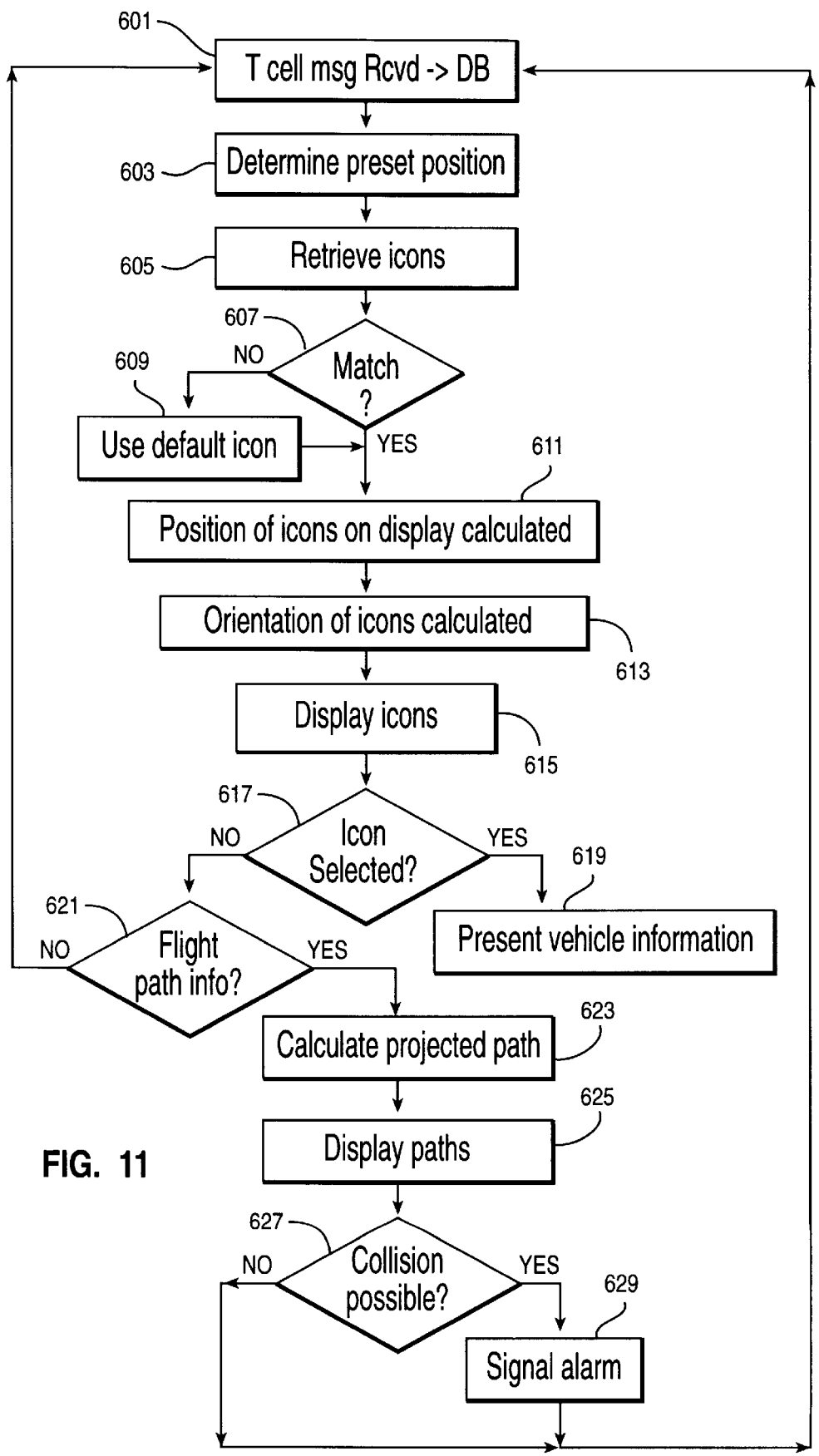
FIG. 11 shows a flow diagram for presenting the user interface in FIG. 8.

FIG. 11 shows a flow diagram for presenting the user interface in FIG. 8. In step 601, the TCELL system determines whether any TCELL messages have been received and placed into the vehicle tracking database. If so in step 603, the system determines its present position. Next, in step 605, the system retrieves icons according to the vehicle IDs in any new TCELL messages. A certain number of vehicles may have already been recognized by the TCELL system from prior messages. If a match can not be found, step 607, a default icon for the type of vehicle which sent the TCELL message, step 609. As mentioned above, the format of the message may give some clues as to an appropriate choice.

Next, placement of the icons is calculated on the display according to the position given in the respective TCELL messages relative to the operator's vehicle, step 611. Orientation of the icons is calculated according to the heading information in the TCELL messages, step 613. As discussed above this may involve the selection of a different icon or a calculated rotation of the graphic icon for the vehicle. In step 615, the user interface is presented on the display.

A test is performed in step 617 to determine whether an icon has been selected by the operator. If so, in step 619, a panel is presented containing information about the selected vehicle is presented. This information may be from the TCELL message or possibly from other sources. Next, in step 621, a test is performed to determine whether flight path information has been requested by the operator. If so, in step 623, the TCELL system calculates the projected flight paths of the selected vehicle and the operator's vehicle from the TCELL data. In step 625, the projected flight paths are presented. The display of the flight paths can elapse over time so that the operator can see how closely the two vehicles will approach each other. There can be separate steps for showing the selected vehicle's path and that of the operator's vehicle.

If the calculated flight paths are closer than some recommended distance an alarm or panel can be presented recommending a course of action can be presented, step 627. The alarm can take the form of highlighting a portion of the projected paths in a prominent color, e.g., red, or causing the flight paths to blink. Audio signals are also possible.

In an alternative embodiment of the invention, the TCELL system will automatically calculate the projected flight paths of all detected vehicles. If one of the vehicle paths is projected to come too close to the operator's vehicle, the icon for that vehicle will blink or otherwise be highlighted in some manner. This will naturally cause the operator to select the icon, whereupon some of the action described above.

The TCELL display is refreshed every TCELL cycle, e.g., every ten seconds, step 629.

As described above, the preferred embodiments of the invention are a system programmed to execute the method or methods described herein, the methods themselves and a computer program product. The sets of instructions which comprise the computer program product are resident in a random access memory of one or more systems as described generally above during execution. Until execution, the sets of instructions can be stored in another type of memory such as flash memory, hard disk or CD-ROM memory. Furthermore, the sets of instructions can be stored in the memory of another computer and transmitted to the system when desired by a wired or wireless network transmission medium. The physical storage or transmission of the sets of instructions change the medium in which they are resident. The change may be electrical, magnetic, chemical or some other physical change.

While the present invention, its features and advantages have been described with reference to certain illustrative embodiments, those skilled in the art would understand that various modifications, substitutions and alterations can be made without departing from the scope and spirit of the invention. For example, the direction of travel can be used as a parameter to establish which minicell and therefore which time slice a TCELL transmitter is allocated. In a road oriented in a north south direction, vehicles traveling north in a given 100 foot diameter cell would be considered to be in a different minicell than vehicles traveling south in the same 100 foot diameter cell. They would therefore transmit at different times. Using direction to determine the minicell is possible for an air or sea application as well. Therefore, the invention should be not construed as being narrower than the appended claims.

We claim:

1. A method for displaying the location of machines in space, comprising the steps of:

at each machine, determining a location of the machine via a global positioning system calculation;

at each machine, determining a cell corresponding to the determined location;

at each machine, broadcasting a message at a time slice allocated for the cell, wherein the message is indicative of the type of machine broadcasting; and receiving broadcasted messages from a plurality of machines;

using the received broadcasted messages to determine the locations of the plurality of machines;

choosing a representation of each machine according to a machine type; and presenting the representations within a user interface display according to the determined locations.

2. The method as recited in claim 1, further comprising the steps of:

using the received broadcasted messages to determine direction of travel of each of the plurality of machines; and orienting the representation of each machine to indicate a direction of travel for the respective machine.

3. The method as recited in claim 2, further comprising a step of presenting a representation of a user machine in which the user interface display is located in the user interface display.

4. The method as recited in claim 3 wherein a display space allocated for space in the direction of travel of the user machine is greater than a display space allocated for space away from the direction of travel of the user machine.

5. The method as recited in claim 3, further comprising the steps of:

determining a velocity, location and direction for the user machine;

determining a velocity for an approaching machine, the approaching machine being one of the plurality of machines;

calculating a projected path of the approaching machine based on the determined velocity, location and direction of the approaching machine; and presenting the projected path of the approaching machine in the user interface display.

6. The method as recited in claim 1, further comprising the steps of:

broadcasting a message at a time slice allocated for a cell in which a stationary object is located;

choosing a representation of the stationary object; and presenting the stationary object representation at a location within the user interface display indicating the location of the stationary object.

7. The method as recited in claim 1, further comprising the steps of:

determining at least one cell location in which a weather phenomenon is located;

broadcasting a message in at least one time slice allocated for the at least one cell in which the weather phenomenon is located;

choosing a representation of the weather phenomenon object; and presenting the weather phenomenon representation at a location within the user interface display indicating the location of the weather phenomenon.

8. The method as recited in claim 1, further comprising the steps of:

determining a cell location in which an unequipped machine is located by an equipped machine, wherein the unequipped machine lacks a means of performing the steps in claim 1;

broadcasting a message in the time slice allocated for the cell in which the unequipped machine is located;

choosing a representation of the unequipped machine; and presenting the unequipped machine representation at a location within the user interface display indicating the location of the non broadcasting vehicle.

9. The method as recited in claim 8 wherein the unequipped machine is an airplane which broadcasts messages using an alternative collision avoidance system and the equipped machine receives messages from the alternative collision avoidance system.

10. The method as recited in claim 1 wherein the user interface display presents a three dimensional representation of terrain beneath the plurality of machines, wherein at least one machine is an aircraft represented in the user interface display as a floating representation appearing to float at an indicated altitude over the terrain representation.

11. The method as recited in claim 1 wherein a first set of machines of the plurality of machines are aircraft and a second set of the plurality of machines are ground vehicles.

12. The system as recited in claim 1, further comprising:
    means for determining a cell location in which an unequipped machine is located by an equipped machine, wherein the unequipped machine lacks a means of claim 2;
    means for broadcasting a message in the time slice allocated for the cell in which the unequipped machine is located;
    means for choosing a representation of the unequipped machine; and
    means for presenting the unequipped machine representation at a location within the user interface display indicating the location of the non broadcasting vehicle.

13. The system as recited in claim 1 wherein the user interface display presents a three dimensional representation of terrain beneath the plurality of machines, wherein at least one machine is an aircraft represented in the user interface display as a floating representation appearing to float at an indicated altitude over the terrain representation.

14. A system including processor, memory and display for displaying location and direction of travel of machines in space, comprising:
    means for receiving broadcasted messages from a plurality of machines, wherein each broadcasted message is indicative of a machine type of a respective machine;
    means for using the received broadcasted messages to determine the locations and direction of the plurality of machines;
    means for choosing a representation of each machine according to a machine type; and
    means for orienting each representation to indicate the determined direction of travel for the respective machine and presenting the each representation at a location within a user interface display to indicate the determined location for the respective machine.

15. The system as recited in claim 14, further comprising:
    means for determining a location of the machine via a global positioning system calculation;
    means for determining a cell corresponding to the determined location;
    means for determining a time slice allocated for the cell; and
    means for broadcasting a message at the time slice, wherein the message is indicative of the type of machine broadcasting.

16. The system as recited in claim 14, further comprising:
    means for broadcasting a message at a time slice allocated for a cell in which a stationary object is located;
    means for choosing a representation of the stationary object; and
    means for presenting the stationary object representation at a location within the user interface display indicating the location of the stationary object.

17. The system as recited in claim 14, further comprising the steps of:
    means for determining at least one cell location in which a weather phenomenon is located;
    means for broadcasting a message in at least one time slice allocated for the at least one cell in which the weather phenomenon is located;
    means for choosing a representation of the weather phenomenon object; and
    means for presenting the weather phenomenon representation at a location within the user interface display indicating the location of the weather phenomenon.

18. The system as recited in claim 14, further comprising:
    means for determining a velocity, location and direction for a user machine;
    means for determining a velocity for an approaching machine, the approaching machine being one of the plurality of machines;
    means for calculating a projected path of the approaching machine based on the determined velocity, location and direction of the approaching machine; and
    means for presenting the projected path of the approaching machine in the user interface display.

19. A computer program product in a computer readable medium for displaying location and direction of travel of machines in space, comprising:
    means for receiving broadcasted messages from a plurality of machines, wherein each broadcasted message is indicative of a machine type of a respective machine;
    means for using the received broadcasted messages to determine the locations and direction of travel of the plurality of machines;
    means for choosing a representation of each machine according to a machine type; and
    means for orienting each representation to indicate the determined direction of travel for the respective machine and presenting the each representation at a location within a user interface display according to the determined location for the respective machine.

20. The product as recited in claim 19, further comprising:
    means for determining a location of the machine via a global positioning system calculation;
    means for determining a cell corresponding to the determined location;
    means for determining a time slice allocated for the cell; and
    means for broadcasting a message at the time slice, wherein the message is indicative of the type of machine broadcasting.

21. The product as recited in claim 20, further means for presenting a representation of a user machine in which the user interface display is located in the user interface display.

22. The product as recited in claim 21, further comprising:
    means for determining a velocity, location and direction for the user machine;
    means for determining a velocity for an approaching machine, the approaching machine being one of the plurality of machines;
    means for calculating a projected path of the approaching machine based on the determined velocity, location and direction of the approaching machine; and
    means for presenting the projected path of the approaching machine in the user interface display.

23. The product as recited in claim 19, further comprising:
    means for broadcasting a message at a time slice allocated for a cell in which a stationary object is located;
    means for choosing a representation of the stationary object; and
    means for presenting the stationary object representation at a location within the user interface display indicating the location of the stationary object.

24. The product as recited in claim 19, further comprising the steps of:
   means for determining at least one cell location in which a weather phenomenon is located;
   means for broadcasting a message in at least one time slice allocated for the at least one cell in which the weather phenomenon is located;
   means for choosing a representation of the weather phenomenon object; and
   means for presenting the weather phenomenon representation at a location within the user interface display indicating the location of the weather phenomenon.

25. The product as recited in claim 19, further comprising:
   means for determining a cell location in which an unequipped machine is located by an equipped machine, wherein the unequipped machine lacks a means of claim 2;
   means for broadcasting a message in the time slice allocated for the cell in which the unequipped machine is located;
   means for choosing a representation of the unequipped machine; and
   means for presenting the unequipped machine representation at a location within the user interface display indicating the location of the non broadcasting vehicle.

26. The product as recited in claim 19 wherein the user interface display presents a three dimensional representation of terrain beneath the plurality of machines, wherein at least one machine is an aircraft represented in the user interface display as a floating representation appearing to float at an indicated altitude over the terrain representation.

* * * * *